(12) United States Patent
Mao

(10) Patent No.: US 6,215,683 B1
(45) Date of Patent: Apr. 10, 2001

(54) POWER CONVERTER WITH VOLTAGE DEPENDENT SWITCHABLE MODES

(75) Inventor: Hengchun Mao, Plano, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/170,618

(22) Filed: Oct. 13, 1998

(51) Int. Cl.[7] ........................................ H02M 1/10
(52) U.S. Cl. ................................. 363/142; 363/17
(58) Field of Search ........................... 363/17, 132, 142, 363/143

(56) References Cited

U.S. PATENT DOCUMENTS

| | | | |
|---|---|---|---|
| 4,570,211 | * | 2/1986 | Manda et al. ............... 363/142 |
| 4,691,275 | * | 9/1987 | Moscovici ................... 363/143 |
| 5,200,887 | * | 4/1993 | Ioroi et al. ................... 363/143 |

OTHER PUBLICATIONS

J. Sebastian, J.A. Cobos, O. Garcia and J. Uceda, "An Overall Study of the Half–Bridge Complementary–Control DC–to–DC Converter," Jun. 1995 IEEE, pp. 1229–1235.
Tamotsu Ninomiya, Norio Matsumoto, Masatoshi Nakahara and Koosuke Harada, "Static and Dynamic Analysis of Zero–Voltage–Switched Half–Bridge Converter with PWM Control," Apr. 1991 IEEE, pp. 230–237.
Ionel Dan Jitaru and Alexandru Ivascu, "Quasi–Integrated Magnetic an Avenue for Higher Power Density and Efficiency in Power Converters," Feb. 1997 IEEE, pp. 395–402.
Ionel Dan Jitaru and Serban Birca–Galateanu, "Small–Signal Characterization of the Forward–Flyback Converters with Active Clamp," Sep. 1998 IEEE, pp. 626–632.
Nasser H. Kutkut, Glen Luckjiff and Deepak M. Divan, "A Dual Bridge High Current DC–to–DC Converter With Soft Switching Capability," IEEE Industry Applications Society Annual Meeting, New Orleans, Louisiana, Oct. 5–9, 1997.

* cited by examiner

*Primary Examiner*—Jeffrey Sterrett

(57) ABSTRACT

For use with a power converter having an input, first and second capacitors and first and second switches, a mode selection circuit, having selectable modes of operation, a method of configuring a power converter, and power converter employing the mode selection circuit and method are provided. In one embodiment, the mode selection circuit may function in two modes of operation. In a first mode, based upon an input voltage, the mode selection circuit is adapted to couple the first and second capacitors and the first and second switches together as a half-bridge converter. In a second mode, based upon the input voltage, the mode selection circuit is adapted to couple the first switch and the first capacitor together as a forward-flyback converter and to further couple the second capacitor and the second switch as a clamp thereto. In another embodiment, the first mode is a high voltage mode, in response to a high input voltage and the second mode is a low voltage mode, in response to a low input voltage.

20 Claims, 2 Drawing Sheets

POWER CONVERTER WITH VOLTAGE DEPENDENT SWITCHABLE MODES

TECHNICAL FIELD OF THE INVENTION

The present invention is directed, in general, to power converters and, more specifically, to a power converter operable over selectable voltage ranges and method of operation thereof.

BACKGROUND OF THE INVENTION

In many applications, the input voltage of DC/DC converters can vary over a very wide range. In various telecommunications applications, nominal input voltages of 24 V and 48 V may have actual ranges of about 18 to 75 V. Even for international systems employing AC input voltages where the standard is commonly an input voltage of 110 V and 220 V, wide DC/DC converter input voltage ranges exist.

To compensate for the wide range of input voltages, most power converters operate in smaller subranges, which are usually about 18 V–36 V (24 V nominal) and about 36 V–75 V (48 V nominal). As a result, a customer generally inventories two products for the same output specification thereby increasing the inventory costs and the development costs for manufacturers employing the power converters. Unfortunately, there is not a single product that covers the entire voltage range for many applications.

In low power applications, flyback converters may be employed to cope with wide input voltage ranges. The flyback converters, however, suffer from low efficiencies due, in part, to the high voltage/current stresses on components therein caused by wide duty cycle variations necessary to handle the varying input voltages. For high power applications, various authors suggest using dual bridge converters to address the wide operating voltage ranges. Proposed topologies are essentially full-bridge converters with two two-switch forward inputs. At low input voltage ranges, the inputs are connected in parallel, and at high input voltage ranges, the two inputs are switched to a series connection. Through this topology, the effective input voltage is nominally maintained in both high and low voltage ranges. The primary drawback to this configuration is the extremely complex power stage structure and switching mechanisms necessary to accommodate the two ranges. Due to these complexities, the topology is not suitable for many applications such as low to medium power installations.

Accordingly, what is needed in the art is switchable power converter topology that operates over a wide range of input voltages.

SUMMARY OF THE INVENTION

To address the above-discussed deficiencies of the prior art, the present invention provides, for use with a power converter having an input, first and second capacitors and first and second switches, a mode selection circuit, having selectable modes of operation, a method of configuring a power converter, and power converter employing the mode selection circuit and method.

In one embodiment, the mode selection circuit has two modes of operation. In a first mode, based upon an input voltage, the mode selection circuit is adapted to couple the first and second capacitors and the first and second switches together as a half-bridge converter. In a second mode, based upon the input voltage, the mode selection circuit is adapted to couple the first switch and the first capacitor together as a forward-flyback converter and to further couple the second capacitor and the second switch as a clamp thereto. In another embodiment, the first mode is a high voltage mode, in response to a high input voltage and the second mode is a low voltage mode, in response to a low input voltage.

The present invention introduces the broad concept of employing a mode selection circuit to change the configuration of the converter topology in response to changes in the input voltage level. The mode selection circuit thus allows the converter to operate in a configuration that is most suitable to the input voltage level provided.

In one embodiment, the first and second switches are each adapted to conduct for a duty cycle of less than 50%. In another embodiment, the first switch is adapted to conduct for a duty cycle of less than 50% and the second switch is adapted to conduct for a duty cycle of greater than 50%. The duty cycle relates to the conduction period of the respective switches. The broad scope of the present invention, however, is not limited to a particular conduction interval for the switches. The duty cycle or switching frequency, or both may be controlled to provide a well regulated output.

In one embodiment, the mode selection circuit is selected from the group consisting of: (1) switchable relays, (2) jumpers, (3) semiconductor switching devices, and (4) two pin packages capable of being selectively connected. Those skilled in the art will recognize that other types of switching devices may be employed and that the broad scope of the invention is not limited to any particular switching device.

In one embodiment, the input voltage is about 18 VDC to about 75 VDC. In an advantageous embodiment, an input voltage of about 18 VDC to about 36 VDC is characterized as a low voltage level and an input voltage of about 36 VDC to about 75 VDC is characterized as a high voltage level.

In one embodiment, the power converter further comprises an isolation transformer coupled to the first and second switches. Isolation transformers are well known in the art and -hose skilled in the art are familiar with such components.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
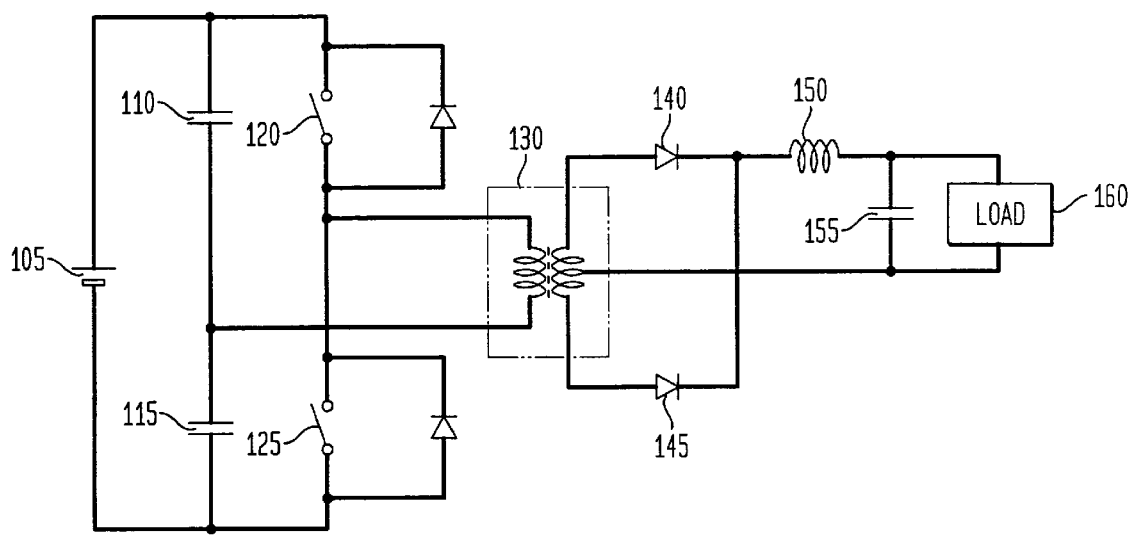
FIG. 1 illustrates a schematic diagram of a prior art half-bridge power converter.

Referring initially to FIG. 1, illustrated is a schematic diagram of a prior art half-bridge power converter 100. In this well known topology, the converter 100 receives DC power from a DC voltage source 105. First and second power capacitors 110, 115 are coupled in series across the DC voltage source 105. Series-coupled first and second power switches are further coupled across the DC power source 105. A primary winding of an isolation transformer 130 is coupled between the first and second power capacitors 110, 115 and the first and second power switches 120, 125 to complete the front end of the power converter 100.

The converter 100 further includes first and second rectifying diodes 140, 145 that are coupled to outer taps of a secondary winding of the isolation transformer 130. An output inductor 150 is coupled to the diodes 140, 145 and to an output capacitor 155 that is further coupled to the center tap of the secondary winding of the isolation transformer 130. Finally, a load is coupled across the output capacitor 155.

Figure 2:
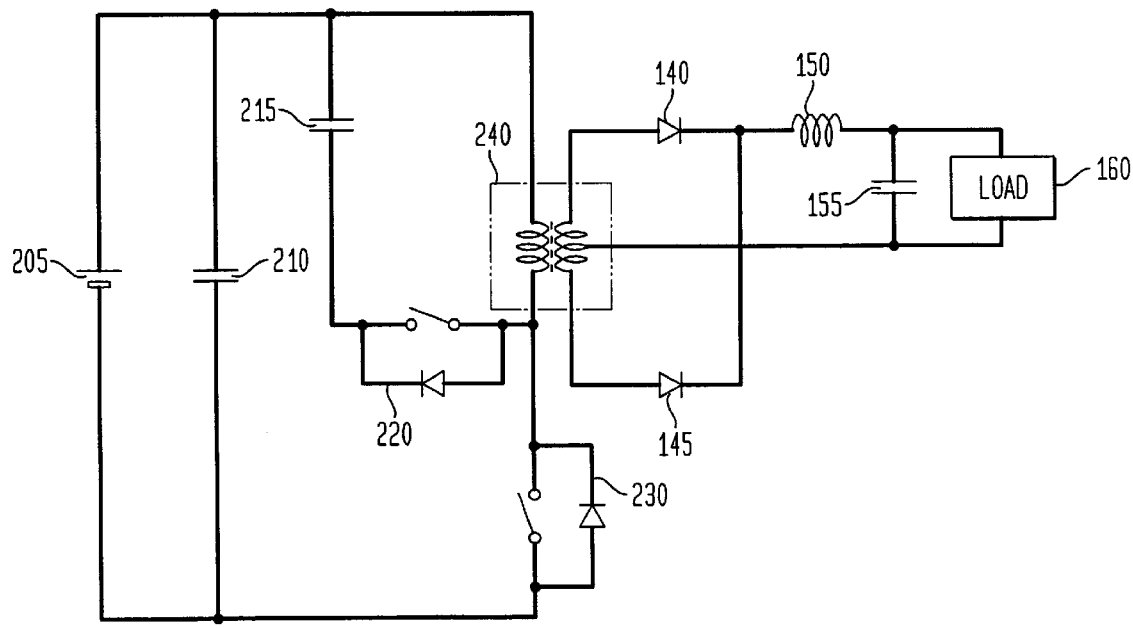
FIG. 2 illustrates a schematic diagram of a prior art forward-flyback power converter with an active clamp.

Turning now to FIG. 2, illustrated is a schematic diagram of a prior art forward-flyback power converter 200 with an active clamp. In this known topology, the front end of the converter 200 receives DC power from a DC voltage source 205. A power capacitor 210 is coupled across the DC voltage source 205 and a power switch 230 is coupled in series with a primary winding of an isolation transformer 240 across the power capacitor 210. Further, an active clamp circuit including a clamp capacitor 215 and a clamp switch 220 is series-coupled across the primary winding of the isolation transformer 240.

The components coupled to a secondary winding of the isolation transformer 240 are analogous to those employed in the half-bridge converter 100 of FIG. 1. Inasmuch as the half-bridge and forward-flyback converter topologies are known in the art, a detailed description of the operation thereof is not presented herein. As described above, the aforementioned individual topologies suffer from various drawbacks and a new topology that overcomes some of the deficiencies thereof would satisfy a commercial need.

Figure 3:
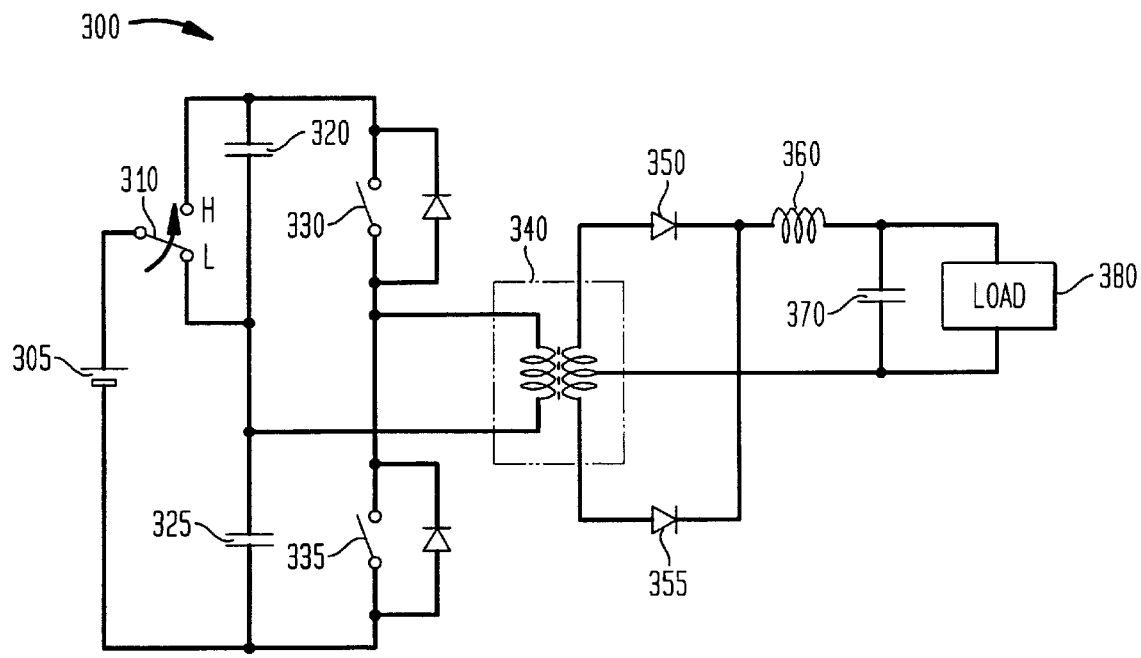
FIG. 3 illustrates a schematic diagram of a power converter constructed according to the principles of the present invention.

Turning now to FIG. 3, illustrated is a schematic diagram of a power converter 300 constructed according to the principles of the present invention. The front end of the converter 300 receives DC power from a DC voltage source 305. A mode selection circuit 310 is coupled to the DC voltage source and may be selectable coupled to either a high voltage node H or to a low voltage node L. The mode selection circuit 310 may be almost any switching device including, but not limited to, switchable relays, jumpers, semiconductor switching devices or even merely two pins in a package that can be selectively connected. A first power capacitor 320 is coupled to the high voltage node H and a node between the first power capacitor and a second power capacitor 325. Further, the low voltage power node L is coupled the node located between the first and second power capacitors 320, 325.

Series-coupled first and second power switches 330, 335 are further coupled across the DC power source 305. A primary winding of an isolation transformer 340 is coupled between the first and second power capacitors 320, 325 and the first and second power switches 330, 335 to complete the front end of the power converter 300.

The converter 300 further includes first and second rectifying diodes 350, 355 that are coupled to outer taps of a secondary winding of the isolation transformer 340. An output inductor 360 is coupled to the diodes 350, 355 and to an output capacitor 370 that is further coupled to the center tap of the secondary winding of the isolation transformer 230. Finally, a load 380 is coupled across the output capacitor 370.

This converter 300 is basically an single integrated topology that may be switched to form a half-bridge or forward-flyback configuration. The converter 300 functions in a first mode as a half-bridge converter when the mode selection circuit 310 is coupled to the high voltage node H, thereby coupling the first and second power switches 330, 335 and the first and second power capacitors 320, 325 together. The converter 300 further functions in a second mode as a clamped forward-flyback converter when the mode selection circuit 310 is coupled to the low voltage node L, thereby coupling the second power switch 335 and the second power capacitor 325 together as the forward-flyback converter and the first power switch 330 and the first power capacitor 320 thereto as the clamp.

The first mode may also be referred to as a high voltage mode and the second mode may be referred to as a low voltage mode. The typical input voltage level ranges from about 18 V to about 75 V. in a preferred embodiment, when typical input voltage level ranges are about 18 V–36 V for low voltage and 36V–75 V for high voltage, the mode selection circuit 310 may be switched between modes at about 36 V. If the voltage ranges are different, the voltage where the mode selection circuit changes modes may vary.

It should be understood that the first or second power capacitor 320, 325 is optional; also, portions of the secondary winding of the isolation transformer 340 do not necessarily need to be identical for proper operation of the converter 300.

The control of the first and second power switches 330, 335 may be accomplished in various fashions under either high or low voltage modes. The primary difference concerns the duty cycle limits. A half-bridge converter commonly requires the effective duty cycle to be lower than 50%, while a forward-flyback converter prefers a maximum duty cycle of over 50%, to optimize its performance. To employ different duty cycle limits in different operating modes, various control methods may be implemented.

In a preferred embodiment, using a conventional control scheme, one of the switches 330, 335 has a first duty cycle (D) and the other has a second duty cycle (1–D). In this methodology, the first duty cycle D1 is less than 50% and the second duty cycle D2 is greater than 50%. One major drawback to this technique is that one of the diodes 350, 355 is exposed to high voltage when the converter 300 is operating as a half-bridge converter. When the converter 300 is working at its highest input voltage, one of the diodes 350, 355 is subjected to approximately twice the voltage required during low voltage operation. The increased voltage stress increases the converter construction costs and power loss, especially during synchronous rectification.

Under this control technique, while the first power switch 330 conducts, the second power switch 335 will not conduct, and vice versa. In response, while the second power switch 335, having a duty cycle D of less than 50%, conducts, the output inductor 360 will charge. At this point, when operating in the half-bridge configuration, the voltage across the first power capacitor 320 will be $(1-D) \cdot Vin$, where Vin is the DC input voltage and D is the duty cycle of the second power switch 335. Further, in a forward-flyback configuration, the voltage across the first capacitor 320 will be $(D/(-D)) \cdot Vin$. Once the second power switch 335 stops conducting and the first power switch 330 starts conducting, the output inductor 360 will discharge. The voltage across the second power capacitor 325 at this time will be $D \cdot Vin$ in the half-bridge configuration and Vin in the forward-flyback configuration.

In another preferred embodiment, to overcome the conventional control shortcomings, both switches may be controlled with the same duty cycle. This methodology has been successfully used in half-bridge converters, but is not usually employed in forward-flyback converters. Although zero-voltage switching of the power switches 330, 335 is not possible under this scheme, the switching voltage is reduced and the switches 330, 335 may be turned on with zero current.

While unconventional, this control design shows that reduced voltage switching may achieve a higher efficiency than complete zero-voltage switching due to its reduced circulating energy. In this fashion, the voltage stress on the secondary diodes 350, 355 can be equal under half-bridge converter operation (i.e., high voltage) and under low voltage operation.

In contrast to the previous control format, under this control technique, the time when the switches 330, 335 are not conducting will overlap. In conjunction therewith, when one of the switches 330, 335 is conducting in a half-bridge mode, the output inductor 360 will charge. During this period, the charge across the corresponding power capacitor 320, 325 will equal to Vin/2. When, during the switching cycle, both power switches 330, 335 are not conducting, the output inductor 360 discharges.

While specific embodiments of a power converter have been illustrated and described, other embodiments are well within the broad scope of the present invention. For a better understanding of power supplies, in general, see "Principles of Power Electronics" by John G. Kassakian, et al., Addison Wesley, Inc. (1991), and which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a power converter having an input, first and second capacitors and first and second switches, a mode selection circuit, having selectable modes of operation, comprising:
    a first mode, based upon an input voltage, wherein said mode selection circuit is adapted to couple said first and second capacitors and said first and second switches together as a half-bridge converter; and
    a second mode, based upon said input voltage, wherein said mode selection circuit is adapted to couple said first switch and said first capacitor together as a forward-flyback converter and to couple said second capacitor and said second switch as a clamp thereto.

2. The mode selection circuit as recited in claim 1 wherein said first and second modes are a high voltage mode and a low voltage mode, respectively.

3. The mode selection circuit as recited in claim 1 wherein said first and second switches are each adapted to conduct for a duty cycle of less than 50%.

4. The mode selection circuit as recited in claim 1 wherein said first switch is adapted to conduct for a duty cycle of less than 50% and said second switch is adapted to conduct for a duty cycle of greater than 50%.

5. The mode selection circuit as recited in claim 1 wherein said mode selection circuit is selected from the group consisting of:
    switchable relays,
    jumpers,
    semiconductor switching devices, and
    two pin packages capable of being selectively connected.

6. The mode selection circuit as recited in claim 1 wherein said input voltage is about 18 VDC to about 75 VDC.

7. The mode selection circuit as recited in claim 1 wherein said power converter further comprises an isolation transformer coupled to said first and second switches.

8. A method of configuring a power converter having an input, first and second capacitors and first and second switches, comprising:
    generating a first mode of operation, based upon an input voltage, whereby said first and second capacitors and said first and second switches are coupled as a half-bridge converter; and
    generating a second mode of operation, based upon said input voltage, whereby said first switch and said first capacitor are coupled as a forward-flyback converter with a clamp including said second capacitor and said second switch coupled thereto.

9. The method as recited in claim 8 wherein said first mode on and said second mode are a high voltage mode and a low voltage mode, respectively.

10. The method as recited in claim 8 further comprising inducing said first and second switches each to conduct for a duty cycle of less than 50%.

11. The method as recited in claim 8 further comprising inducing said first switch to conduct for a duty cycle of less than 50% and inducing said second switch to conduct for a duty cycle of greater than 50%.

12. The method as recited in claim 8 wherein said acts of generating are performed by a mode selection circuit selected from the group consisting of:
    switchable relays,
    jumpers,
    semiconductor switching devices, and
    two pin packages capable of being selectively connected.

13. The method as recited in claim 8 wherein said input voltage is about 18 VDC to about 75 VDC.

14. The method as recited in claim 8 further comprises coupling an isolation transformer to said first and second switches.

15. A power converter having an input comprising:
    first and second capacitors;
    first and second switches;
    an isolation transformer coupled to said first and second switches; and
    a mode selection circuit, having selectable modes of operation, comprising:
        a first mode, based upon an input voltage, wherein said mode selection circuit couples said first and second capacitors and said first and second switches together as a half-bridge converter; and
        a second mode, based upon said input voltage, wherein said mode selection circuit couples said first switch and said first capacitor together as a forward-flyback converter and couples said second capacitor and said second switch as a clamp thereto.

16. The power converter as recited in claim 15 wherein said first and second modes are a high voltage mode and a low voltage mode, respectively.

17. The power converter as recited in claim 15 wherein said first and second switches each conduct for a duty cycle of less than 50%.

18. The power converter as recited in claim 15 wherein said first switch conducts for a duty cycle of less than 50% and said second switch conducts for a duty cycle of greater than 50%.

19. The power converter as recited in claim 15 wherein said mode selection circuit is selected from the group consisting of:
    switchable relays,
    jumpers,
    semiconductor switching devices, and
    two pin packages capable of being selectively connected.

20. The power converter as recited in claim 15 wherein said in input voltage is about 18 VDC to about 75 VDC.

* * * * *